US012752684B2

(12) United States Patent
Line et al.

(10) Patent No.: US 12,752,684 B2
(45) Date of Patent: Oct. 6, 2026

(54) SEATBACK ASSEMBLY FOR A VEHICLE

(71) Applicant: Ford Global Technologies, LLC, Dearborn, MI (US)

(72) Inventors: Johnathan Andrew Line, Northville, MI (US); Miguel Angel Carcamo, Mexico City (MX); Chris Fredriksson, LaSalle (CA); Jesus Alejo Avila, Mexico City (MX); Cristian Banu, LaSalle (CA); Justin Berger, Livonia, MI (US); S.M. Akbar Berry, Lasalle (CA); Shawn Anthony Dixon, Windsor (CA)

(73) Assignee: Ford Global Technologies, LLC, Dearborn, MI (US)

(*) Notice: Subject to any disclaimer, the term of this patent is extended or adjusted under 35 U.S.C. 154(b) by 268 days.

(21) Appl. No.: 18/670,210

(22) Filed: May 21, 2024

(65) Prior Publication Data

US 2025/0360850 A1 Nov. 27, 2025

(51) Int. Cl.

| | |
|---|---|
| ***B60N 2/80*** | (2018.01) |
| ***B60N 2/56*** | (2006.01) |
| ***B60N 2/68*** | (2006.01) |
| ***B60N 2/90*** | (2018.01) |
| ***B60R 16/03*** | (2006.01) |

(52) U.S. Cl.

CPC ................. *B60N 2/56* (2013.01); *B60N 2/80* (2018.02); *B60N 2/90* (2018.02); *B60R 16/03* (2013.01); *B60N 2/68* (2013.01)

(58) Field of Classification Search

CPC .......... B60N 2/80; B60N 2/894; B60N 2/868; B60N 2/569; B60N 2/68; B60N 2/60; B60N 2/865; B60R 16/03; A47C 7/00

USPC ..... 297/220, 391, 408, 217.4, 184.11, 218.5, 297/452.59

See application file for complete search history.

(56) References Cited

U.S. PATENT DOCUMENTS

| | | | | | |
|---|---|---|---|---|---|
| 3,019,050 | A * | 1/1962 | Spielman | B64D 11/064 | 297/343 |
| 4,540,217 | A * | 9/1985 | Suzuki | B60N 2/865 | 297/391 |
| 5,129,707 | A * | 7/1992 | Yamauchi | B60N 2/68 | 297/452.18 |
| 6,616,236 | B1 * | 9/2003 | Su | A47C 7/38 | 297/410 |
| 6,623,073 | B2 * | 9/2003 | Schafer | B60N 2/888 | 297/216.12 |

(Continued)

*Primary Examiner* — Maria E Graber

(74) *Attorney, Agent, or Firm* — Vichit Chea; Price Heneveld LLP

(57) ABSTRACT

A seating assembly for a vehicle includes a first seatback having a first headrest. A second seatback has a second headrest. A crossmember is disposed along an upper portion of the seating assembly and extends seatback-laterally between the first seatback and the second seatback. A first receiver is disposed in the upper portion of the seating assembly and is configured to guide the first headrest in a seatback-rearward direction to connect the first headrest with the first seatback. A second receiver is disposed in the upper portion of the seating assembly and is configured to guide the second headrest in the seatback-rearward direction to connect the second headrest with the second seatback. At least one support member operably couples the first receiver and the second receiver with the crossmember.

20 Claims, 7 Drawing Sheets

(56) References Cited

U.S. PATENT DOCUMENTS 6,779,840 B1 * 8/2004 Farquhar ................ B60N 2/847
297/216.12
6,840,560 B2 * 1/2005 Flogard .................. B60N 2/888
297/216.12
8,356,860 B2 * 1/2013 Nakaya .................. B60N 2/366
297/14
8,602,492 B2 * 12/2013 Nakaya .................... B60N 2/68
297/216.12
8,696,060 B2 * 4/2014 Mizobata ................. B60N 2/68
297/216.12
8,740,301 B2 6/2014 Liu
9,061,616 B2 * 6/2015 Kondrad ................ B60N 2/853
9,085,253 B2 * 7/2015 Delling .................. B60N 2/865
9,120,406 B2 * 9/2015 Sato ..................... B60N 2/5825
9,475,413 B2 * 10/2016 Hayashi ................. B60N 2/688
9,527,414 B2 * 12/2016 Talamonti .............. B60N 2/874
9,539,923 B2 * 1/2017 Ishimoto .................. B60N 2/64
10,035,442 B2 7/2018 Kondrad et al.
10,252,648 B2 * 4/2019 Barbat ..................... B60N 2/64
10,500,997 B2 * 12/2019 Maloney ................ B60N 2/829
10,604,050 B2 * 3/2020 Palmieri ................ B60N 2/894
10,744,915 B2 8/2020 McElroy et al.
10,793,038 B2 10/2020 Chang et al.
11,135,958 B2 * 10/2021 Chaer .................... B60N 2/874
11,285,853 B1 * 3/2022 Line ..................... B60N 2/7005
11,407,347 B2 * 8/2022 Jarsaeter ................ B60N 2/888
11,613,192 B2 * 3/2023 Morilhat ................ B60N 2/865
297/410
12,202,393 B2 * 1/2025 Yu .......................... B60N 2/865
12,391,156 B2 * 8/2025 Koreishi ................. B60R 22/24
12,447,883 B2 * 10/2025 Schmitt .................. B60N 2/865
2010/0148550 A1 * 6/2010 Kidd ...................... B60N 2/818
381/86
2012/0001462 A1 * 1/2012 Cyoukyu ................. B60N 2/68
297/216.13
2012/0032480 A1 * 2/2012 Orzelski ................ B60N 2/888
297/216.12
2013/0134751 A1 * 5/2013 Jammalamadaka ... B60N 2/874
297/391
2020/0247294 A1 * 8/2020 Kang ..................... B60N 2/427
2021/0245639 A1 * 8/2021 Morilhat ................ B60N 2/821
2022/0379780 A1 12/2022 Salter et al.
2025/0162481 A1 * 5/2025 Shin ....................... B60N 2/865

* cited by examiner

SEATBACK ASSEMBLY FOR A VEHICLE

FIELD OF THE DISCLOSURE

The present disclosure generally relates to seatback assemblies for vehicles, more particularly, to upper support structures shared between seats of a vehicle.

BACKGROUND OF THE DISCLOSURE

Conventional rear seating solutions can be limited in multifunctionality. There is a need for greater functionality to optimize user experience.

SUMMARY OF THE DISCLOSURE

According to a first aspect of the present disclosure, a seating assembly for a vehicle includes a first seatback having a first headrest, a second seatback having a second headrest, a crossmember disposed along an upper portion of the seating assembly and extending seatback-laterally between the first seatback and the second seatback, a first receiver disposed in the upper portion of the seating assembly and configured to guide the first headrest in a seatback-rearward direction to connect the first headrest with the first seatback, a second receiver disposed in the upper portion of the seating assembly and configured to guide the second headrest in the seatback-rearward direction to connect the second headrest with the second seatback, at least one support member operably coupling the first receiver and the second receiver with the crossmember.

Embodiments of the first aspect of the present disclosure can include any one or a combination of the following features:

- one support member includes a bar extending substantially parallel to the crossmember between the first and second seatbacks;
- the bar includes a first extension aligned with the first seatback and extending downwardly to fasten to the crossmember and a second extension aligned with the second seatback and extending downwardly to fasten to the crossmember;
- the first and second headrests include a rod extending generally normal to a front surface of the headrests;
- one support member includes a first bracket coupled with the crossmember at the first seatback and a second bracket coupled with the crossmember at the second seatback;
- a panel disposed below the headrest and above a body of the seatbacks, the panel extending seatback-laterally between the first seatback and the second seatback;
- a speaker coupled with the panel;
- an electrical outlet coupled with the panel;
- a ventilation system having a fluid outlet coupled with the panel for providing airflow; and
- a blower arranged behind the seatback for pressurizing air to the fluid outlet.

According to a second aspect of the present disclosure, a vehicle includes a cabin having a rear wall; and a seating assembly disposed along the rear wall and includes a first seatback having a first headrest, a second seatback having a second headrest, a crossmember disposed along an upper portion of the seating assembly and extending seatback-laterally between the first seatback and the second seatback, a first receiver disposed in the upper portion of the seating assembly and configured to guide the first headrest in a seatback-rearward direction to connect the first headrest with the first seatback, a second receiver disposed in the upper portion of the seating assembly and configured to guide the second headrest in the seatback-rearward direction to connect the second headrest with the second seatback, at least one support member operably coupling the first receiver and the second receiver with the crossmember.

Embodiments of the second aspect of the present disclosure can include any one or a combination of the following features:

- one support member includes a bar extending substantially parallel to the crossmember between the first and second seatbacks;
- the bar includes a first extension aligned with the first seatback and extending downwardly to fasten to the crossmember and a second extension aligned with the second seatback and extending downwardly to fasten to the crossmember;
- each of the first and second headrests includes a rod extending generally normal to a front surface of the headrests;
- a panel disposed below the headrest and above a body of the seatbacks, the panel extending seatback-laterally between the first seatback and the second seatback;
- the crossmember is configured to mount to a frame of the vehicle at a first side of the frame and at a second side of the frame;
- the crossmember includes plurality of sleeves and a crossbar extending between a first end and a second end, wherein the plurality of sleeves includes a first sleeves disposed at the first end and adjustable along the crossbar and a second sleeve disposed at the second end and adjustable along the crossbar; and
- a ventilation system having a fluid outlet coupled with the panel for providing airflow, the ventilation system including a blower arranged behind the seatback for pressurizing air to the fluid outlet.

According to a third aspect of the present disclosure, a seating assembly for a vehicle includes a first seatback having a first headrest, a second seatback having a second headrest, a crossmember disposed along an upper portion of the seating assembly and extending seatback-laterally between the first seatback and the second seatback, a first receiver disposed in the upper portion of the seating assembly and configured to guide the first headrest in a seatback-rearward direction to connect the first headrest with the first seatback, a second receiver disposed in the upper portion of the seating assembly and configured to guide the second headrest in the seatback-rearward direction to connect the second headrest with the second seatback, and a bar operably coupling the first receiver and the second receiver with the crossmember and extending substantially parallel to the crossmember between the first and second seatbacks. The bar includes a first extension aligned with the first seatback and extending downwardly to fasten to the crossmember, and a second extension aligned with the second seatback and extending downwardly to fasten to the crossmember.

Embodiments of the third aspect of the present disclosure can include any one or a combination of the following features:

- a panel disposed below the headrest and above a body of the seatbacks, the panel extending seatback-laterally between the first seatback and the second seatback.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
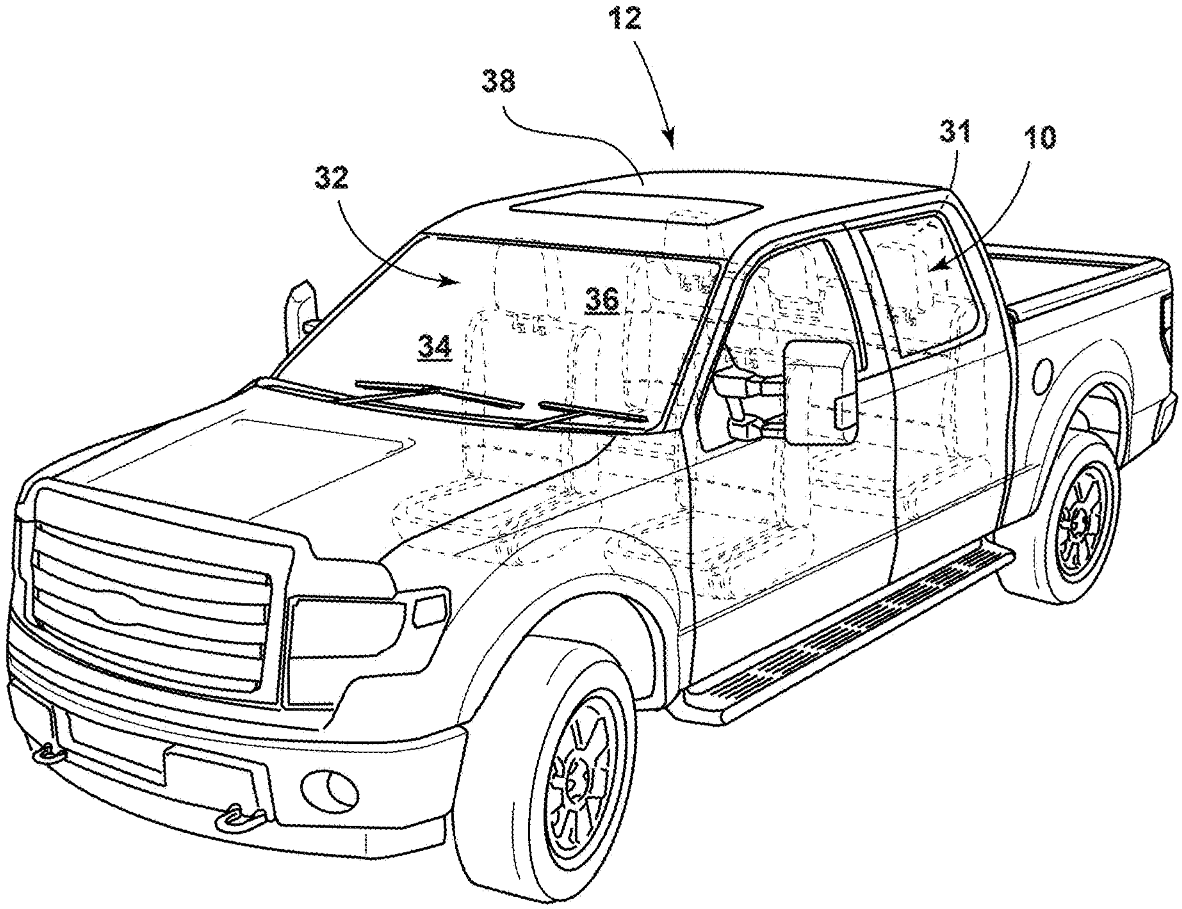
FIG. 1 is a perspective view of a vehicle incorporating a seating assembly constructed according to an aspect of the present disclosure.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms “upper,” “lower,” “right,” “left,” “rear,” “front,” “vertical,” “horizontal,” and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a seatback assembly for a vehicle 12. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Referring generally to FIGS. 1-7, a seating assembly 10 is generally designated at 10. In general, the seating assembly 10 can provide for enhanced operability with respect to adjustability by allowing components that are typically vertically removeable/installable vertically to be removed/installed horizontally in a vehicle 12. The seating assembly 10 can further provide for enhanced user experience by providing additional features in the seating assembly 10, such as audio, ventilation, and lighting. The seating assembly 10 can also provide for enhanced space utilization by providing cross-seat solutions that can make room for the additional audio, ventilation, and/or lighting components.

Referring still to FIGS. 1-7, a seating assembly 10 for a vehicle 12 includes a first seatback 14*a* having a first headrest 16*a*. A second seatback 14*b* has a second headrest 16*b*. A crossmember 22 is disposed along an upper portion 24 of the seating assembly 10 and extends seatback-laterally between the first seatback 14*a* and the second seatback 14*b*. A first receiver 26 is disposed in the upper portion 24 of the seating assembly 10 and is configured to guide the first headrest 16*a* in a seatback-rearward direction to connect the first headrest 16*a* with the first seatback 14*a*. A second receiver 28 is disposed in the upper portion 24 of the seating assembly 10 and is configured to guide the second headrest 16*b* in the seatback-rearward direction to connect the second headrest 16*b* with the second seatback 14*b*. At least one support member operably couples the first receiver 26 and the second receiver 28 with the crossmember 22.

In some examples, the seating assembly 10 is a rear seating assembly 10 of the vehicle 12 disposed adjacent to a rear wall 31 of a cabin 32 of the vehicle 12. For example, the seatbacks 14*a*, 14*b*, 14*c* can be incorporated as a bench-type seatback for a three-seat configuration having a third headrest 16*c* and a third seatback 14*c*. Further, while referred to as multiple seatbacks 14*a*, 14*b*, 14*c*, it is contemplated that the seatbacks 14*a*, 14*b*, 14*c* of the seating assembly 10 incorporated herein can be structurally a common seatback-rather, the multiple seatbacks 14*a*, 14*b*, 14*c* can refer to different seating positions for occupants of the vehicle 12. For example, as will be further described herein, the crossmember 22 can link two or more of the seatbacks 14*a*, 14*b*, 14*c* together and, in some examples, to a frame of the vehicle 12.

Referring now to FIG. 1, the vehicle 12 includes the cabin 32 configured to seat passengers/occupants of the vehicle 12. For example, the cabin 32 can include a front area 34 and a rear area 36. In the present example, the seating assembly 10 is disposed along the rear wall 31 of the cabin 32. A top wall 38 of the vehicle 12 further defines a height of the cabin 32. As will be described further herein, the height of cabin 32 can limit interaction in the vehicle 12, for example, by limiting accessibility to remove or install seating components.

Figure 2:
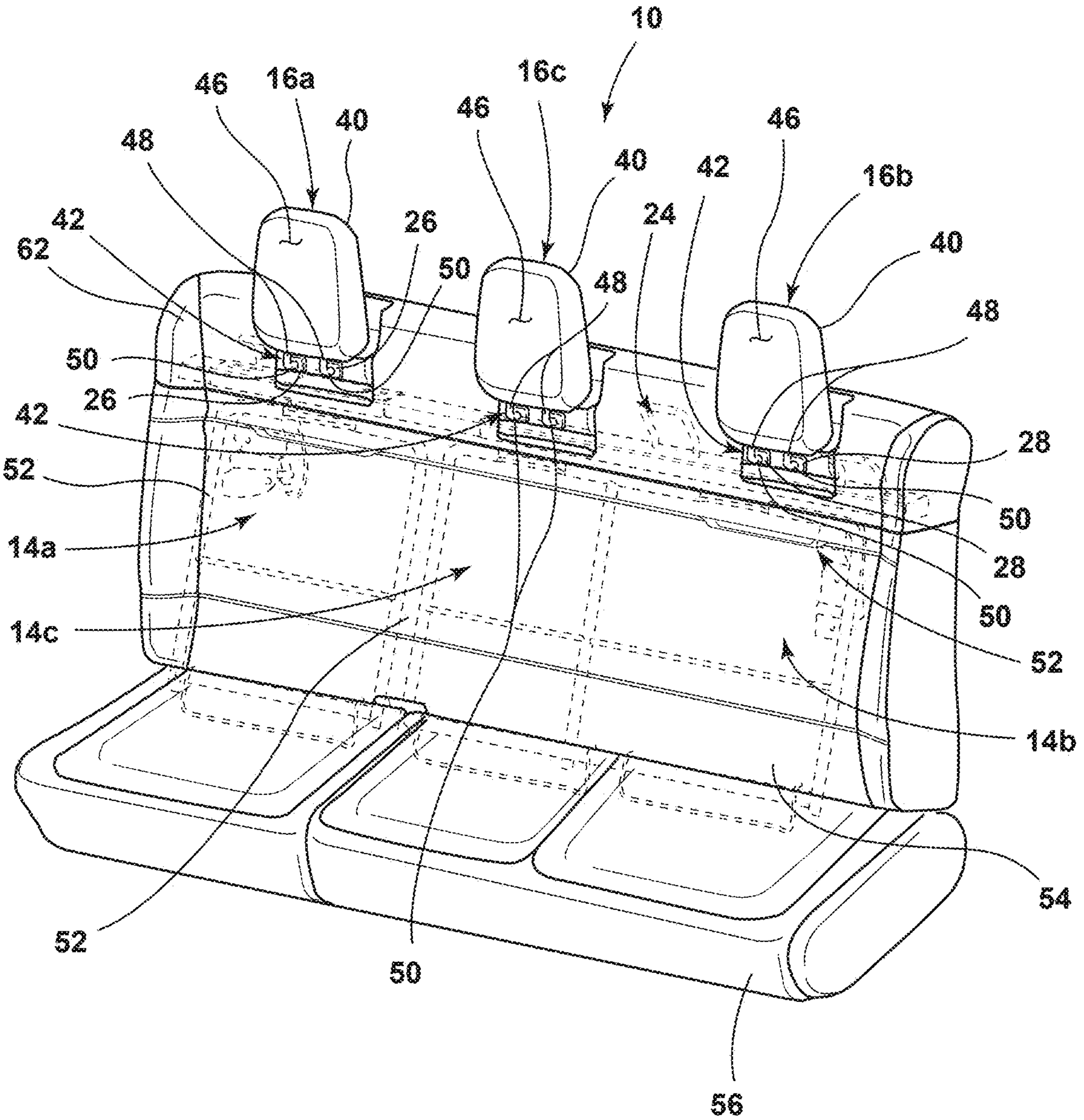
FIG. 2 is perspective view of a seating assembly including seatbacks constructed according to an aspect of the present disclosure.

For example and with reference to FIG. 2, the headrests 16*a*, 16*b*, 16*c* typically include a headrest body 40 and one or more rods 42 that extend in a headrest-downward direction from the headrest for insertion into the receiver on the seatback, which is also typically positioned vertically, or extending in a seatback-upward/downward direction. Thus, because the headrest has a headrest height 44 that includes a height of the headrest body 40 and a vertical length of the at least one rod 42, the height of the cabin 32 would typically limit installation or removal of the headrests 16*a*, 16*b*, 16*c* to specific seatback positions or otherwise present ergonomic limitations to move the headrest out of the seatback. According to at least one aspect of the present disclosure, the rods 42 of each headrest 16*a*, 16*b*, 16*c* can extend generally normal to a front surface 46 of the headrests 16*a*, 16*b*, 16*c* to allow the headrests 16*a*, 16*b*, 16*c* to be installed in a seatback-rearward direction and removed in a seatback-forward direction. It is contemplated that the rods 42 can include multiple rod 42 portions, such as a vertical portion 48 and a horizontal portion 50, or a single horizontal portion 50 that extends directly from the headrest. In the present example, the rods 42 extend downwardly from the headrest body 40 to the horizontal portion 50, which extends outwardly from the vertical portion 48.

Figure 3:
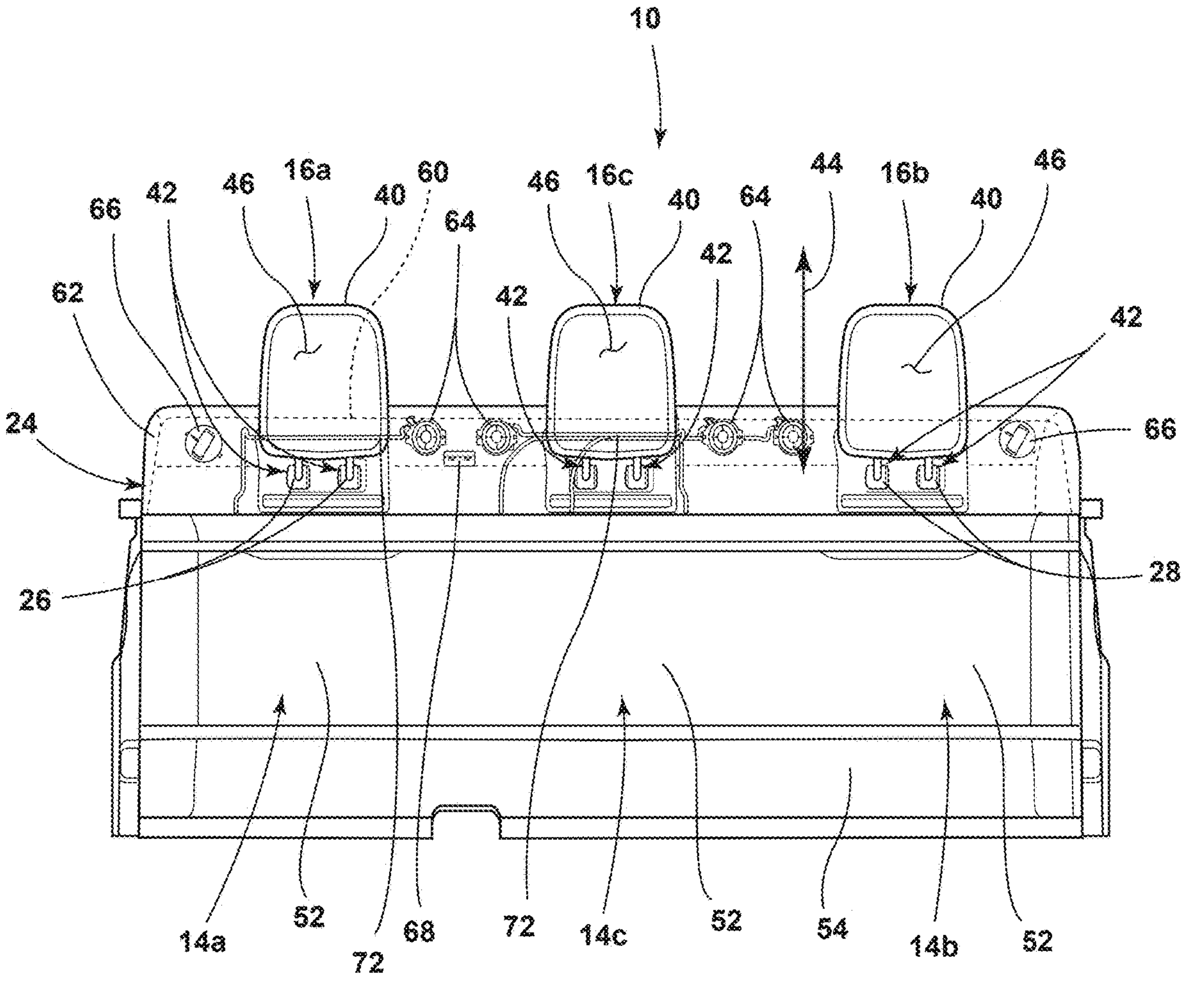
FIG. 3 is a front view of the seatbacks of FIG. 2 with a part of the seatbacks in phantom demonstrating components within the seatbacks.
Figure 4:
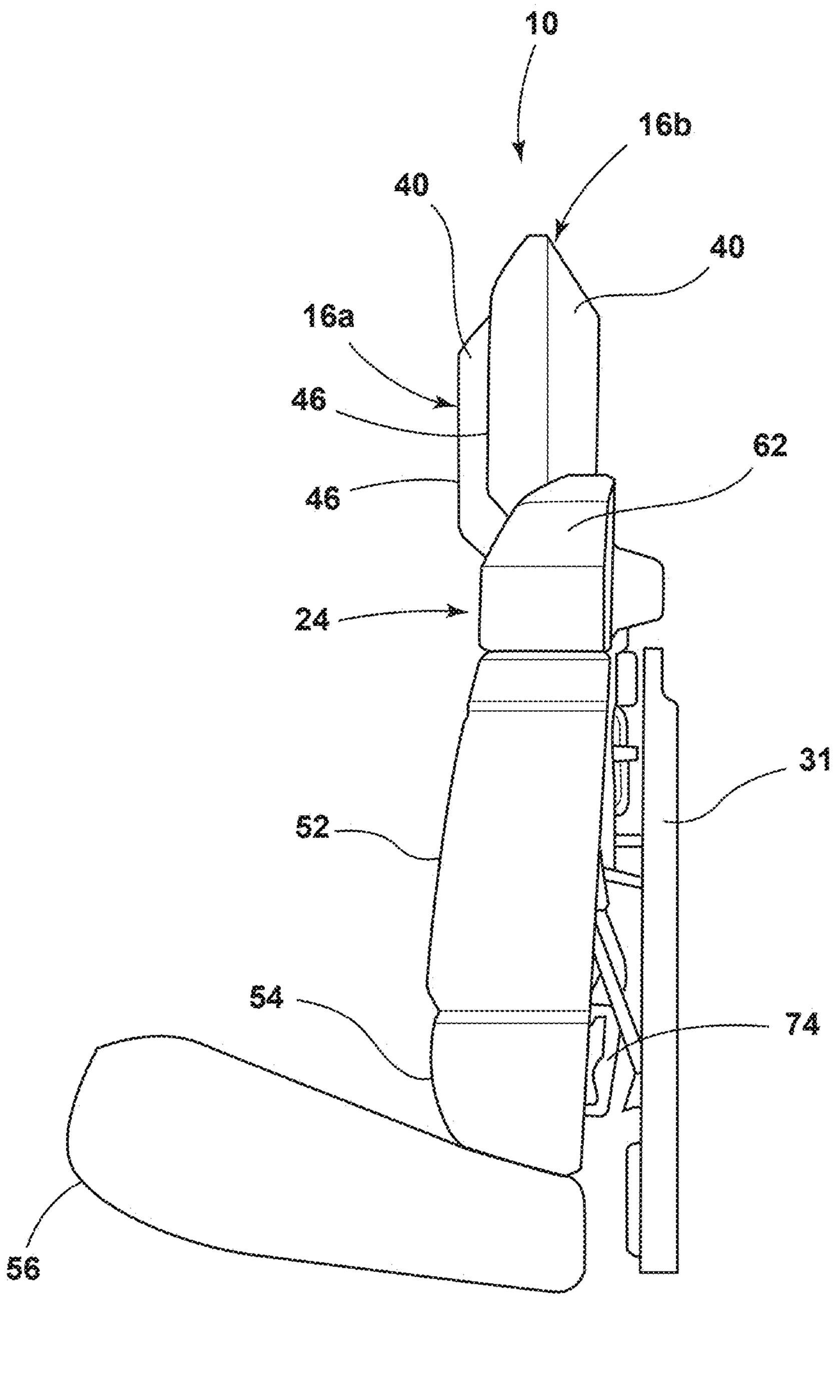
FIG. 4 is a side view of the seatbacks of FIG. 2.
Figure 5:
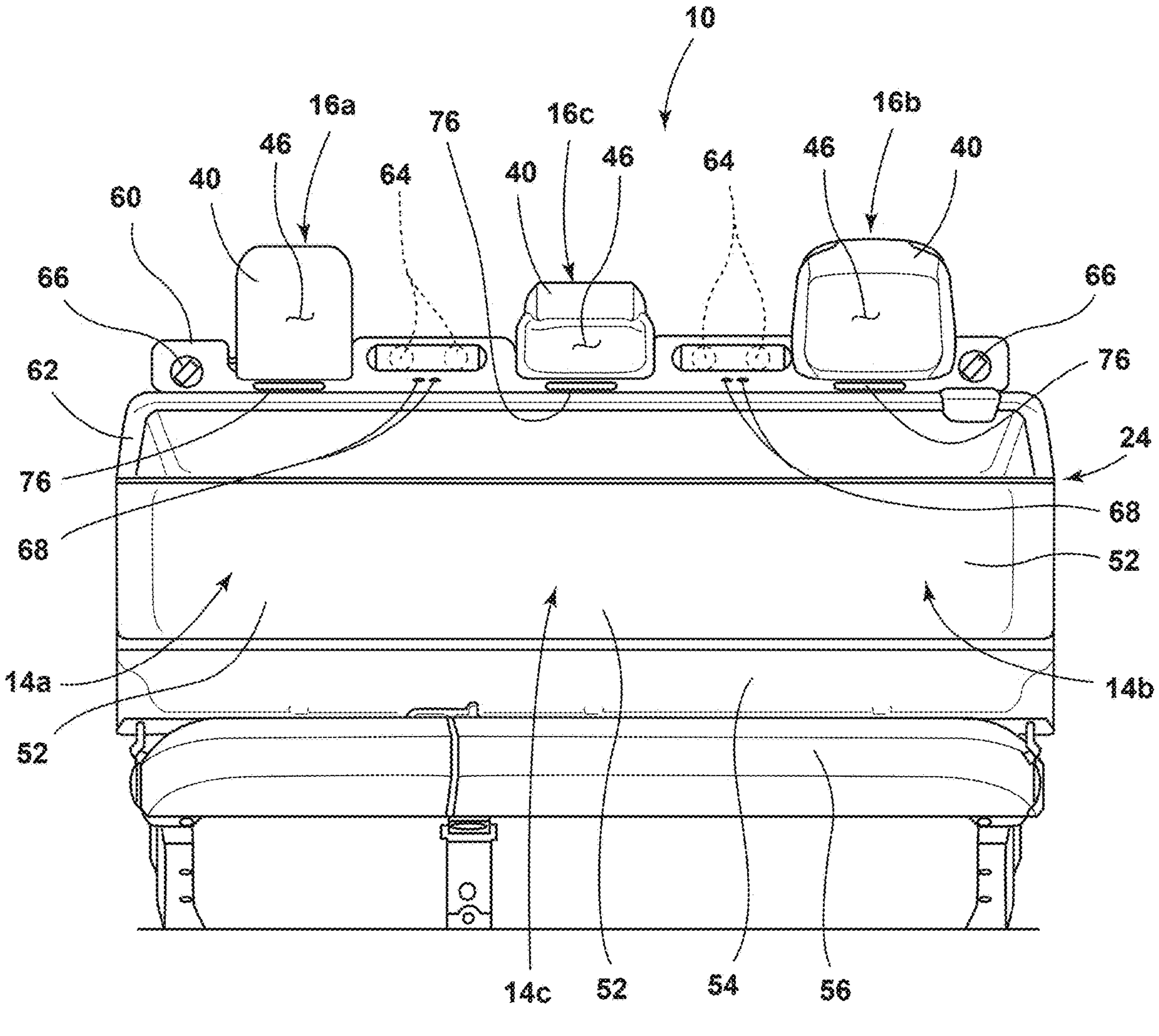
FIG. 5 is front plan view of a seating assembly incorporating seatbacks constructed according to an aspect of the present disclosure.

Referring more generally now to FIGS. 2-4, the seatback can include a seatback body 52 extending between a lower portion 54 adjacent to a seatbase 56 (FIG. 2) and the upper portion 24 near the headrests 16*a*, 16*b*, 16*c*. The seatback body 52 can include cushions or padding. As will be described with respect to FIGS. 6A-7, the padding can be supported via framing 58 under the padding that supports each seatback along the seating assembly 10. The seatbacks 14*a*, 14*b*, 14*c* can further include a panel 60 disposed at the upper portion 24 of the seatbacks 14*a*, 14*b*, 14*c*. The panel 60 can be disposed within an upper cushion 62 (FIGS. 2-4) or be exposed (FIG. 5). The panel 60 can incorporate lighting, audio output, ventilation output, and electrical connectivity that are accessible under or through the upper cushion 62.

With particular reference to FIG. 3, speakers 64, lights 66, electrical outlets 68, and/or ventilation can be provided in the panel 60 and/or the upper cushion 62. For example, the speaker and/or the electrical outlets 68 may provide electrical power and/or a communication to a network (e.g., Universal Serial Bus (USB)) via the electrical outlet. The electrical outlets 68 and/or the speakers 64 can be connected to vehicle 12 audio control via electrical conductors 70 in conduits 72 that extend through the seatbacks 14*a*, 14*b*, 14*c*. For example, conduits 72 having wiring carrying audio signals, control signals, power signals, or other electrical signals can extend through the upper cushion 62 and behind or in the seatback body 52. Fluid connections (e.g., air ducts) can be provided within the upper cushion 62 for connecting one or more blowers 74 behind the seating assembly 10 (see FIG. 4).

The ventilation system can be configured to provide airflow directly through the upper cushion 62 or, in some examples via dedicated vents 76 corresponding to each seating position (e.g., each seatback). By way of example, vents 76 (FIG. 5) can be disposed below each headrest 16*a*, 16*b*, 16*c* for cooling the users below the headrests 16*a*, 16*b*, 16*c*. It is contemplated that, while one blower 74 is illustrated in FIG. 4, the seating assembly 10 can include any number of blowers 74 for providing airflow to the users (e.g., one blower 74 for each seatback).

Referring now to FIG. 5, seating assembly 10 may omit the upper cushion 62 and utilize the panel 60 as a visible feature of the seating assembly 10. In this example, the rods 42 are omitted for clarity. For example, the rods 42 can be inserted into the receivers adjacent to the upper cushion 62, the locations of which are demonstrated in FIGS. 6A and 6B. Accordingly, the insertion point for the rods 42 may be below the vents 76.

Figure 6A:
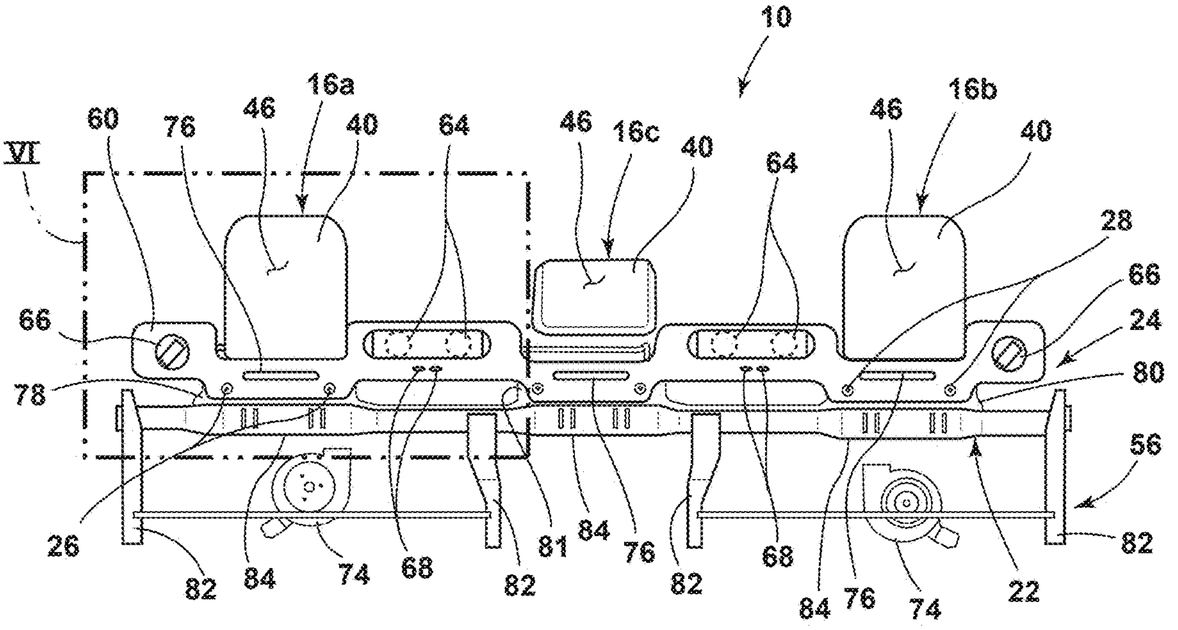
FIG. 6A is a front view of a part of the seatbacks with a part of the seatbacks removed to demonstrate framing components of the seatbacks.
Figure 6B:
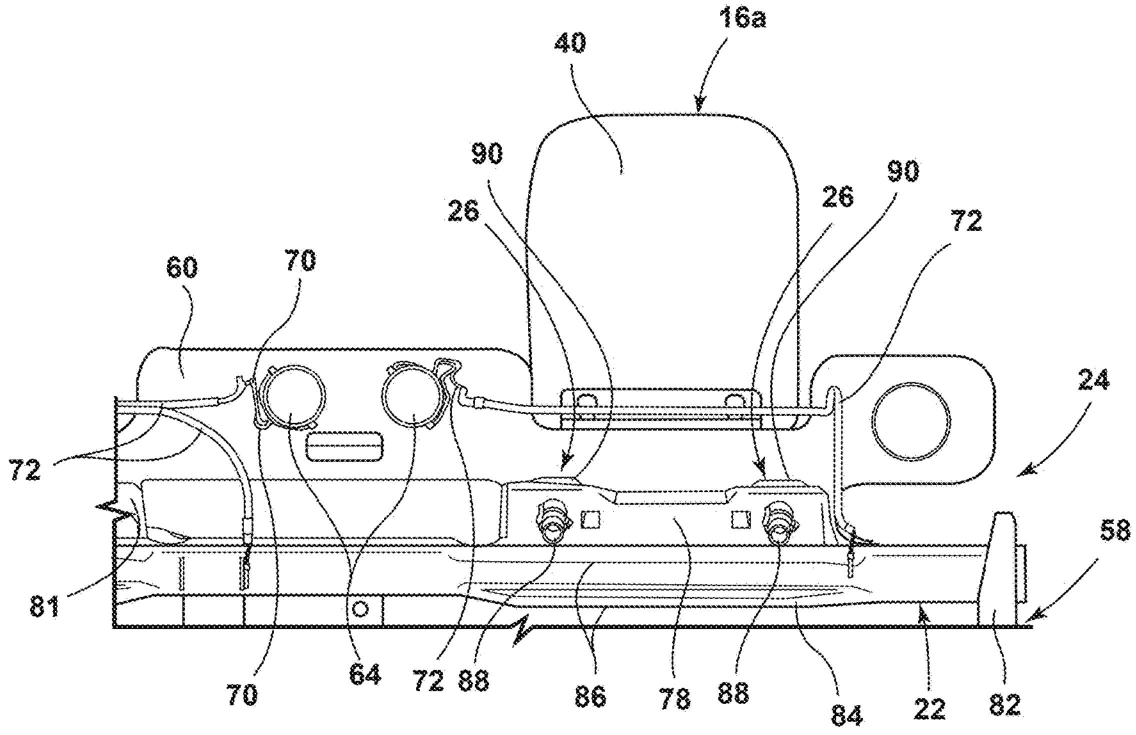
FIG. 6B is a rear view of the seatbacks of FIG. 6A in the section VI.

Referring now to FIGS. 6A and 6B, the seatbacks 14*a*, 14*b*, 14*c* are illustrated with outer layers (e.g., the upper cushion 62, the backrest body) removed to demonstrate specific aspects of the framing 58 and other components under/behind the seatbacks 14*a*, 14*b*, 14*c* in a first example. The headrests 16*a*, 16*b*, 16*c* and the panel 60 are operably connected with the crossmember 22 via the at least one support member which, in the present example, can include a plurality of brackets 78, 80, 81 spaced along the crossmember 22. For example, the plurality of brackets can include a first bracket 78 for the first headrest 16*a*, a second bracket 80 of the second headrest 16*b*, and so on (e.g., third headrest 16*c*). The crossmember 22, which may incorporate a metal structure, extends along the seatbacks 14*a*, 14*b*, 14*c* and can connect with sidewalls of the vehicle 12 in some examples (e.g., a frame of the vehicle 12). The crossmember 22 operably couples with a plurality of upright frame members 82, which may extend at an oblique angle relative to horizontal or may be vertical. In general, the crossmember 22 can be supported by the upright members and/or the vehicle 12 walls. The crossmember 22 can include protruding portions 84 aligned with mounting locations for the headrests 16*a*, 16*b*, 16*c* that are interspaced by straight portions. For example, the protruding portions 84 can include ribs 86 that enhance strength of the crossmember 22 and can provide for mounts. Each bracket can be fastened to the crossmember 22 via the mounts. For example, the mounts can include through-holes with bolts, nuts, screws, welds, or any other fastening mechanism.

With continued reference to FIGS. 6A and 6B, each bracket can protrude upwardly from the crossmember 22 to provide the mounting locations above the crossmember 22. The receivers are fastened to the brackets (via, e.g., welds, fasteners, etc.). Each receiver can be generally tubular and define a receptacle 88 that is configured to releasably secure a rod 42 of the headrest. One or more of the receivers can include an adjuster 90 that can be engaged by the user (e.g., depressed) to release a locking feature of the receiver to position the rod 42 into or out of the receptacle 88. It is contemplated that the rods 42 and the adjusters 90 are omitted form FIG. 6A for clarity. Further, while illustrated as behind the panel 60 in FIG. 6B, the adjuster 90 is positioned in front of the panel 60 adjacent the upper cushion 62. The panel 60 can also be coupled with the brackets at the mounting locations or at another location. For example, the panel 60 can be sandwiched between the brackets and the receivers.

Figure 7:
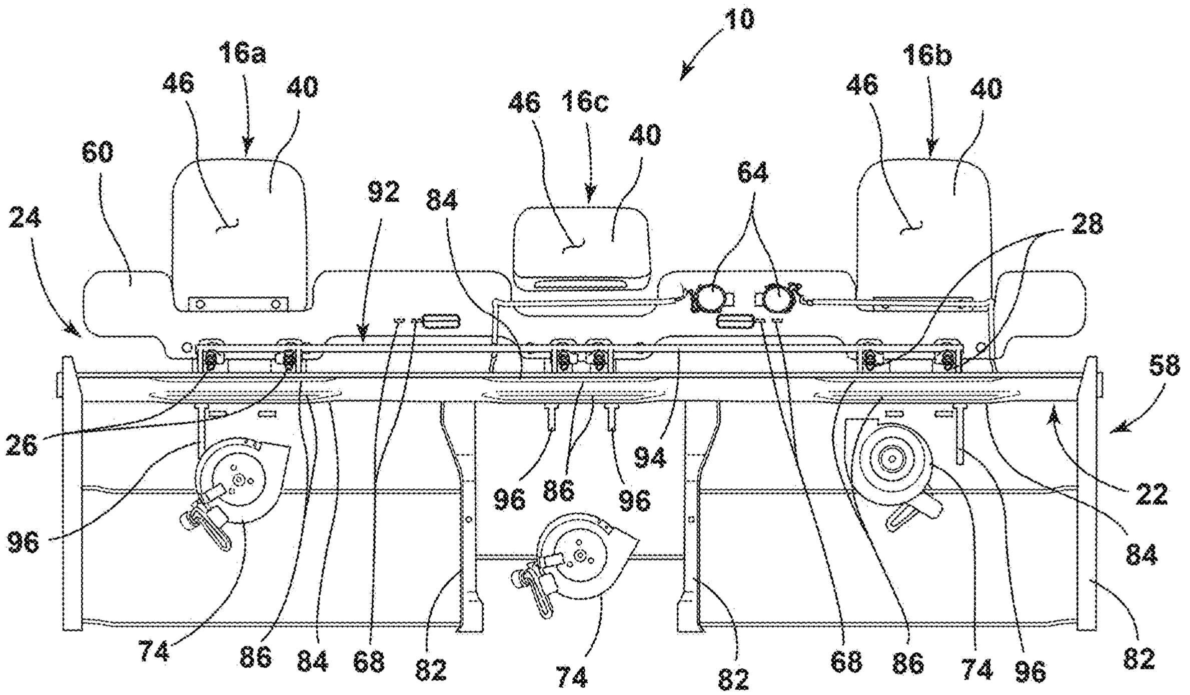
FIG. 7 is a rear view of seatbacks according to another example with part of the seatbacks removed demonstrating framing components of the seatbacks.

Referring now to FIG. 7, the seatbacks 14*a*, 14*b*, 14*c* are illustrated with outer layers (e.g., the upper cushion 62, the backrest body) removed to demonstrate specific aspects of the framing 58 and other components under/behind the seatbacks 14*a*, 14*b*, 14*c* in a second example. In this example, the headrests 16*a*, 16*b*, 16*c* are operably coupled with the crossmember 22 via a bar 92 that extends substantially parallel to the crossmember 22 between the first and second seatbacks 14*a* and 14*b*. For example, the bar 92 can be positioned above the crossmember 22 and include a lateral portion 94 and securing portions 96 that extend downwardly into the crossmember 22 and are mounted to or fastened to the crossmember 22. For example, at least one securing portion 96 can be positioned near each headrest 16*a*, 16*b*, 16*c* supported by the bar 92. Thus, the bar 92 can serve as a mounting part for the receivers and the panel 60.

The bar 92 can provide a vertical offset from the crossmember 22 to provide proper height level for mounting the headrests 16*a*, 16*b*, 16*c*.

It is contemplated that the securing portions 96 that extend downward from the lateral portion 94 of the bar 92 can be configured to engage slots defined by the crossmember 22 that conventionally receive the receivers for vertical-style headrests 16*a*, 16*b*, 16*c*. For example, mounting slots can be provided in the ribs 86 of the crossmember 22 that are aligned with, in a seatback-rearward direction, the mounting locations for the headrests 16*a*, 16*b*, 16*c*. In other words, the crossmember 22 can be configured to receive a first style of headrest (vertical) or a second style of headrest (horizontal via the support member-brackets or the bar 92). In this way, the crossmember 22 can serve as a universal mount for multiple vehicles 12 makes or models.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an endpoint of a range, the disclosure should be understood to include the specific value or end-point referred to. Whether or not a numerical value or endpoint of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A seating assembly for a vehicle, comprising:
a first seatback having a first headrest;
a second seatback having a second headrest;
a crossmember disposed along an upper portion of the seating assembly and extending seatback-laterally between the first seatback and the second seatback;
a first receiver disposed in the upper portion of the seating assembly and configured to guide the first headrest in a seatback-rearward direction to connect the first headrest with the first seatback;
a second receiver disposed in the upper portion of the seating assembly and configured to guide the second headrest in the seatback-rearward direction to connect the second headrest with the second seatback; and
at least one support member operably coupling the first receiver and the second receiver with the crossmember.

2. The seating assembly of claim 1, wherein each of the first and second headrests includes a rod extending generally normal to a front surface of the headrests.

3. The seating assembly of claim 1, wherein the at least one support member includes a first bracket coupled with the crossmember at the first seatback and a second bracket coupled with the crossmember at the second seatback.

4. The seating assembly of claim 1, wherein the at least one support member includes a bar extending substantially parallel to the crossmember between the first and second seatbacks.

5. The seating assembly of claim 4, wherein the bar includes a first extension aligned with the first seatback and extending downwardly to fasten to the crossmember and a second extension aligned with the second seatback and extending downwardly to fasten to the crossmember.

6. The seating assembly of claim 1, further comprising:
a panel disposed below the headrest and above a body of the seatbacks, the panel extending seatback-laterally between the first seatback and the second seatback.

7. The seating assembly of claim 6, further comprising:
a speaker coupled with the panel.

8. The seating assembly of claim 6, further comprising:
an electrical outlet coupled with the panel.

9. The seating assembly of claim 6, further comprising:
a ventilation system having a fluid outlet coupled with the panel for providing airflow.

10. The seating assembly of claim 9, further comprising:
a blower arranged behind the seatback for pressurizing air to the fluid outlet.

11. A vehicle, comprising:
a cabin having a rear wall; and
a seating assembly disposed along the rear wall and including:
a first seatback having a first headrest;
a second seatback having a second headrest;

a crossmember disposed along an upper portion of the seating assembly and extending seatback-laterally between the first seatback and the second seatback;

a first receiver disposed in the upper portion of the seating assembly and configured to guide the first headrest in a seatback-rearward direction to connect the first headrest with the first seatback;

a second receiver disposed in the upper portion of the seating assembly and configured to guide the second headrest in the seatback-rearward direction to connect the second headrest with the second seatback; and at least one support member operably coupling the first receiver and the second receiver with the crossmember.

12. The vehicle of claim 11, wherein each of the first and second headrests include a rod extending generally normal to a front surface of the headrests.

13. The vehicle of claim 11, wherein the at least one support member includes a bar extending substantially parallel to the crossmember between the first and second seatbacks.

14. The vehicle of claim 13, wherein the bar includes a first extension aligned with the first seatback and extending downwardly to fasten to the crossmember and a second extension aligned with the second seatback and extending downwardly to fasten to the crossmember.

15. The vehicle of claim 11, further comprising:

a panel disposed below the headrest and above a body of the seatbacks, the panel extending seatback-laterally between the first seatback and the second seatback.

16. The vehicle of claim 15, further comprising:

a ventilation system having a fluid outlet coupled with the panel for providing airflow, the ventilation system including a blower arranged behind the seatback for pressurizing air to the fluid outlet.

17. The vehicle of claim 11, wherein the crossmember is configured to mount to a frame of the vehicle at a first side of the frame and at a second side of the frame.

18. The vehicle of claim 17, wherein the crossmember includes plurality of sleeves and a crossbar extending between a first end and a second end, wherein the plurality of sleeves includes a first sleeves disposed at the first end and adjustable along the crossbar and a second sleeve disposed at the second end and adjustable along the crossbar.

19. A seating assembly for a vehicle, comprising:

a first seatback having a first headrest;

a second seatback having a second headrest;

a crossmember disposed along an upper portion of the seating assembly and extending seatback-laterally between the first seatback and the second seatback;

a first receiver disposed in the upper portion of the seating assembly and configured to guide the first headrest in a seatback-rearward direction to connect the first headrest with the first seatback;

a second receiver disposed in the upper portion of the seating assembly and configured to guide the second headrest in the seatback-rearward direction to connect the second headrest with the second seatback; and a bar operably coupling the first receiver and the second receiver with the crossmember and extending substantially parallel to the crossmember between the first and second seatbacks, the bar including:

a first extension aligned with the first seatback and extending downwardly to fasten to the crossmember; and a second extension aligned with the second seatback and extending downwardly to fasten to the crossmember.

20. The seating assembly of claim 19, further comprising:

a panel disposed below the headrest and above a body of the seatbacks, the panel extending seatback-laterally between the first seatback and the second seatback.

* * * * *